March 17, 1970      W. H. GIBSON      3,500,755

COMBINED DRAG PUMP AND ELECTRIC MOTOR

Filed May 17, 1968

INVENTOR.
WILLIAM H. GIBSON
BY Lynn H. Latta
—ATTORNEY—

United States Patent Office 3,500,755
Patented Mar. 17, 1970

---

3,500,755
COMBINED DRAG PUMP AND ELECTRIC MOTOR
William H. Gibson, Pacoima, Calif., assignor to Crane Co., doing business as Hydro-Aire Division, Los Angeles, Calif., a corporation of Illinois
Filed May 17, 1968, Ser. No. 729,979
Int. Cl. F04d *13/02*
U.S. Cl. 103—87          11 Claims

ABSTRACT OF THE DISCLOSURE

Disclosed herein is a drag pump incorporated in an induction type electric motor, the pump impeller being an integral part of the motor rotor; and the pump casing, with peripheral flow chamber, being formed integrally in a carbon end plate of the motor, the end plate including an integral bearing in which the rotor shaft is journalled. Pumps are provided at both ends of a motor-pump assembly which is so contructed as to provide for easy conversion from parallel to series pumping by the two pump units.

BACKGROUND OF INVENTION

The drag pump, also designated as the periphery, the tangential, the turbine-vane, the regenerative, the turbulence or the friction pump, is a known type of pump wherein fluid is dragged along a peripheral arcuate fluid is dragged along a peripheral arcuate fluid passage or chamber, between inlet and discharge ports at respective ends of the fluid passage. A fluid head is built up in the direction of fluid drag in the fluid passage and is applied at the discharge port. Between the discharge and the inlet ports, the clearance between the impeller and the casing is reduced so as to block leakage from the high-pressure discharge side of the pump back to the low-pressure inlet side. A typical drag pump is disclosed in the Pezillo patent next referred to.

In the prior patented art, the following patents disclose electric motor and pump combinations: Pezillo et al., 2,805,626, cl. 103—87; Pezillo et al., 2,649,048, cl. 108—87; Krueger et al., 2,671,404, cl. 103—96; Reid, 1,433,037; Durnford 1,377,326.

SUMMARY OF INVENTION

A principal object of this invention is to provide a drag-pump and electric motor combination of maximum simplicity, lightness, compactness, and inexpensive construction. Toward the attainment of these objects, the invention provides a structure wherein dual drag pump impellers are utilized as integral elements of the rotor of an indiction motor, serving as end rings or discs in the rotor. Pump casings are embodied in end plates of the motor, such end plates being of carbon or graphite and embodying integral bearings in which the motor shaft is journalled.

A further object is to provide a unitary motor-pump unit with dual pumps, having convertibility from series-pumping to parallel-pumping arrangement and vice-versa, and with further provision for directing a portion of the hydraulic fluid flow through the motor rotor for cooling and lubrication. This is accomplished by a combination of ports in the respective ends of the housing, together with means to connect these ports in either of two circuit arrangements, one of which will provide for series pumping and the other for parallel pumping.

These and other objects of the invention will become apparent in the following description, taken with the accompanying drawings, in which.

Figure 3:
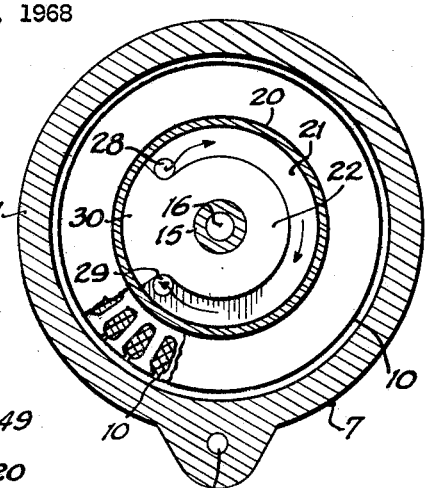
FIG. 3 is a cross-sectional view of the same, taken on line 3—3 of FIG. 1.
Figure 1:
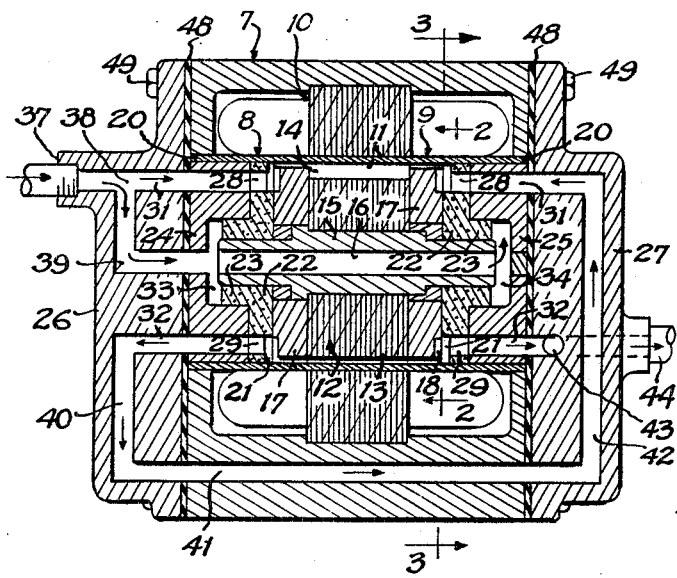
FIG. 1 is an axial sectional view of a combined drag pump and motor embodying impeller blades formed integrally in the end rings of the motor rotor, in a series-pumping arrangement, the section being taken in two axial planes intersecting the pump inlet and discharge ports respectively in a dihedral angle at the motor axis.
Figure 2:
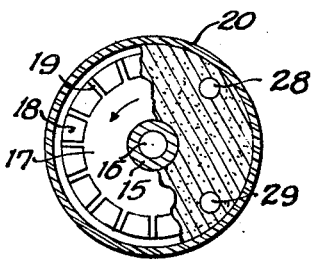
FIG. 2 is a cross-sectional view thereof, taken in two axially-offset planes as indicated by line 2—2 of FIG. 1.

Referring now to the drawing in detail, and particularly FIGS. 1–3, I have shown therein as an example of one form in which the invention may be embodied, a pumping unit of compact, light-weight construction suitable for use on spacecraft (e.g. for pumping coolant fluid where weight-saving is a major consideration).

It comprises a housing body 7 enclosing a pair of drag pumps 8 and 9 and a motor comprising a stator 10 and a rotor 12. Stator 10 has a liner sleeve 20 defining a cylindrical chamber 11 in which rotor 12 is rotatable. Rotor 12 includes a ferro-magnetic core comprising conventional laminations 13 and inductor bars 14, the laminations 13 being mounted on a tubular shaft 15 having an axial fluid passage 16.

Laminations 13 are confined between end rings or discs 17 which also function as pump impellers, being provided in their outer faces, around their peripheries, with sector-shaped pockets 18 defined between radial turbine blades 19 (FIG. 2). Pockets 18 are restricted to a peripheral area having a radial depth limited to a minor proportion of the total radius of the respective disc 17, and establish drag engagement with the fluid in this peripheral area only, thus having the drag type of pumping operation. End discs 17 may be of substantially the same diameter as laminations 13, the end discs and laminations thus collectively constituting a rotor with a cylindrical periphery fitted loosely but closely in the cylindrical housing chamber 11, the closeness of fit between the peripheries of end discs 17 and the wall of chamber 11 (e.g. defined by housing liner sleeves 20) being such that pumping pressures may be developed between the vaned outer faces of discs 17 and pump chambers which are defined within the chamber 11 by arcuate passages 21 (FIG. 3) in end plates 22.

End plates 22 are circular discs of carbon or graphite embodying integral bearings 23 in which the respective ends of shaft 15 are journalled. End plates 22 are mounted in or otherwise secured to housing end members 24 and 25 which in turn are secured to or integral with respective housing end caps 26 and 27, and are fitted in the respective ends of housing chamber 11. End plates 22 and end members 24, 25 have respective inlet and outlet ports 28 and 29 (FIG. 2) which are axially opposed to the turbine pockets 18 so as to communicate directly therewith as the pump impellers rotate. Ports 28, 29 communicate with respective ends of arcuate fluid passages 21 each of which extends throughout the major portion of the circumference of the respective end plate 22. Ports 28, 29 are thus relatively close together across a minor portion of the circumference, which is unrecessed so as to provide a sector-shaped barrier 30 (FIG. 3) separating the ports 28, 29 so as to block flow from the discharge port 29 to the inlet port 28. As in conventional drag pump operation, the impeller is rotated in a direction (indicated by arrow in FIG. 2) to drag the fluid in passage 21 away from the inlet port 28 around the circumference of passage 21 toward the outlet port 29, and the drag of the impeller blades 19 against the fluid in passage 21 creates a head at outlet port 29. Barrier 30 maintains this head by preventing escape of pressure back to the low pressure inlet port 28.

In the conventional drag pump, the inlet and outlet ports enter the arcuate fluid passage or raceway radially, from outside the periphery thereof. In the present invention, the inlet and outlet ports pass through the end plates in a direction parallel to the rotor axis, and communicate with registering inlet and outlet conduits 31 and 32 in end members 24 and 25. The respective ends of axial passage 16 in shaft 15 communicate with lubricant-distributing chambers 33 and 34 in end members 24 and 25 respectively, from which the interengaging bearing surfaces of the shaft ends and the bearings 23 are lubricated by the fluid being pumped, or by lubricant mixed therewith.

Suitable external fluid connections are readily associated with ports 28 and 29 and chambers 33 and 34 to provide, selectively, a series or a parallel pumping circuit, coupled with a constant supply of lubricant to the chambers 33, 34. For example, such external connections may be embodied in the end housing caps 26 and 27 (FIG. 1) providing a series pumping arrangement in which a common inlet 37 in cap 26 delivers fluid through branch passages 38 and 39 to the inlet port of pump 8 and to the lubricant chamber 33. Cap 26 also includes a conduit 40 connecting the outlet port of pump 8 to a traverse conduit 41 extending in housing body 7 parallel to the major axis of the unit. End cap 27, in this series arrangement, includes a conduit 42 connecting the traverse conduit 41 to the inlet port of pump 9. The end housing members 24, 25 include respective central ports for connecting the respective lubricant chambers 33, 34 to the external fluid connections, the central port of end member 24 being open to communicate the inlet conduit 39 with the end cap passage 16 of shaft 15, but the central port of end member 25 being plugged as indicated. Where the end members 24, 25 are integral portions of housing end caps 26, 27, the end member 25, for the series arrangement will be solid, without any central port. End cap 27 further includes an outlet passage 43 registering with outlet passage 32 of end member 25 and leading to a discharge outlet 44 for the unit, thus communicating the outlet of pump 9 with the discharge outlet 44.

In the operation of the series-pumping arrangement of FIG. 1, fluid entering the unit through inlet 37 will be distributed through passage 39 to the hollow shaft 15 to lubricate the bearings at both ends thereof, and through passage 38 to the inlet of pump 8. Pump 8 will deliver the fluid, under a pressure head, from its outlet to connecting passage 40, from which it will be conveyed through conduits 41 and 42 to the inlet of pump 9. A second stage of pumping will occur in pump 9, which will deliver the fluid, under an increased pressure head, from its outlet to the discharge outlet 44, through which it is discharged from the unit.

Figure 4:
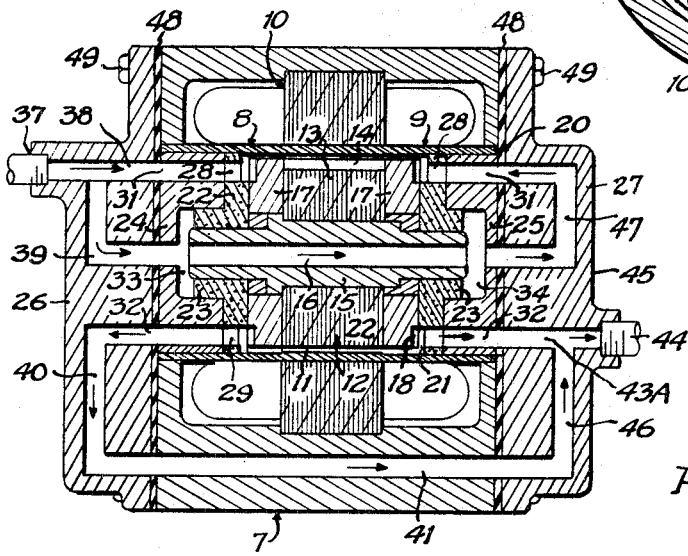
FIG. 4 is an axial sectional view of a modified form having a parallel-pumping arrangement.

Referring now to FIG. 4, the conversion of the unit from series to parallel pumping requires only a change in the connections to pump 9, the connections to pump 8 remaining the same. Where the connections are provided by an end cap such as cap 27, it is replaced by a cap 45 having a conduit 46 for delivering the discharge from pump 8 to the unit discharge outlet 44; having a conduit 47 communicating with center port of end member 25, and with the inlet of pump 9, for delivering a branching inlet flow through shaft passage 16 to pump 9 while the other branch of the common inlet flow goes directly to the inlet of pump 8; and having a conduit 43A connecting the outlet passage 32 of end member 25 to the discharge outlet 44.

In this arrangement the passage 43A joins the passage 46, whereas in the series arrangement passage 43 is isolated from passage 42.

End cap 27 is detachably secured to housing body 7 so as to be readily removable to provide for substitution of the end cap 45 of FIG. 4 when parallel pumping is called for. Conventional cap screws 49 may be utilized for attaching cap 27 or 45 (and also cap 26, for assembly purposes). The caps may be sealed in a conventional manner by gaskets 48 interposed between the caps and the ends of housing body 7. It is also possible to utilize an arrangement embodying valving of the pump which can be changed from parallel to series operation while pumping continues.

It will be understood that conduits 46, 47 and 43A may be embodied in separate tubes suitably connected to end member 25 and housing body 7 as well as to outlet 44; and that the same may be true for conduits 42 and 43 of FIG. 1.

The invention is particularly characterized in that pump impellers 17 are integral parts of rotor 12 and are disposed inwardly of the motor end plates 22 which are of carbon or graphite so as to function as bearing mounts for the ends of rotor shaft 15 while also functioning as pump casing elements, having the raceway fluid passages 21 formed integrally therein.

Figure 5:
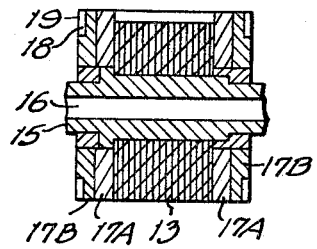
FIG. 5 is an axial sectional view of a modification wherein the impeller blades are formed in end discs separate from the rotor end rings.

The impellers may be embodied integrally in end rings which commonly form part of conventional rotor design (parts 17 of FIGS. 1 and 4 may be taken as representing the conventional end rings, altered by forming the impeller blades integrally therein) or may be embodied in separate end discs 17B, mounted in adjoining relation to the conventional end rings 17A, as shown in FIG. 5. In the appended claims, the term "end discs" is used in a broad sense to designate either the end rings with integral impeller blades, or separate impeller end discs associated with the cenventional end rings of a rotor.

In general, high-head, low flow pumps have low efficiency. The present invention eliminates the windage loss on the end of the rotor and the back of the impeller. Thus the invention provides higher package efficiency.

By connecting the double drag pumps of the invention in series a very high pressure for a small pump can be achieved. This is particularly important for space pumps.

An important feature of the invention is the achievement of extreme simplicity of mechanical construction.

The invention also makes it possible, by using suitable valving, to convert from series to parallel operation while pumping.

I claim:
1. A combined drag pump and electric motor unit comprising, in combination:
   a housing having a central rotor chamber, said housing having axially-opposed end plates, said end plates, embodying respective bearings;
   a rotor disposed in said rotor chamber, said rotor including a shaft having end portions journalled in said bearings;
   said rotor comprising an electromagnetic core;
   and a pair of end discs disposed immediately adjacent respective ends of said core;
   said unit being characterized in that said end discs are formed with peripheral turbine pockets and circumferentially intervening blades in their outer faces so as to function as pump impellers;
   said pockets being contained within peripheral areas of said rotor discs having a radial depth limited to a minor proportion of the disc radius, whereby said impellers will function with a drag-pumping action;
   and said end plates are provided with arcuate fluid passages in their inner faces, in communication with said impeller pockets, thereby cooperating with the respective end discs to provide respective drag pumps immediately at the ends of said rotor.

2. A unit as defined in claim 1, wherein:
   said ports extend through said end plates, parallel to the rotor axis.

3. A unit as defined in claim 2, wherein said housing includes end members having axially extending inlet and outlet passages communicatting with the respective inlet and outlet ports of said end plates and providing for fluid circuit connections between said pumps.

4. A unit as defined in claim 3, wherein said housing includes at one end a detachable end cap to which one of said end members is secured, said end cap and said housing body having therein passages providing communication between the outlet of said other pump and a discharge outlet of said unit.

5. A unit as defined in claim 3, wherein said housing includes at one end a detachable end cap to which one of said end members is secured, said end cap and said housing body having therein passages providing for parallel discharge from the outlets of both pumps to a common discharge outlet of the unit, said end cap having another passage connecting the inlet of said other pump to the adjacent end of said rotor shaft, which is tubular and connected to the inlet of said one pump to provide for parallel inlet flow to said other pump.

6. A unit as defined in claim 1, wherein said end plates are of carbon material providing carbon bearing surfaces in said bearings.

7. A unit as defined in claim 1, including external fluid conduit means providing parallel connections between a common inlet of said unit and the respective pump inlet ports, and external fluid conduit means providing parallel connections between the respective pump outlet ports and a common discharge outlet of said unit, said external fluid conduit means being replaceable by conduit means providing series connections between said pumps.

8. A unit as defined in claim 1, including external fluid conduit means providing for transfer of fluid from the outlet of one of said pumps to the inlet of the other pump, and providing a connection between the outlet of said other pump and a discharge outlet of the unit in a series pumping arrangement, said external conduit means being replaceable, at least in part, by conduit means providing parallel connections between the inlets and outlets of said pump and a common inlet and a common outlet respectively, of said unit.

9. A unit as defined in claim 1, wherein said turbine blades have lateral edges disposed in the planes of said outer end disc faces, whereby said pockets are wholly contained within the body thickness of said end discs.

10. A combined drag pump and electric motor unit comprising, in combination:
- a housing having a central rotor chamber, said housing having axially-opposed end plates, said end plates embodying respective bearings;
- a rotor disposed in said rotor chamber, said rotor including a shaft having end portions journalled in said bearings;
- said rotor comprising an electromagnetic core;
- and a pair of end discs disposed immediately adjacent respective ends of said core;
- said unit being characterized in that said end discs are formed with peripheral turbine blades on the outer faces so as to function as pump impellers;
- and said end plates are provided with arcuate fluid passages in their inner faces, in communication with said impeller vanes, thereby cooperating with the respective end discs to provide respective drag pumps immediately at the end of said rotor;
- said rotor shaft being tubular and including means defining lubricant chambers around the bearings of the respective end plates, said unit further including branch inlet connections from a common inlet of said unit to the inlet of one of said pumps and to one of said lubricant chambers, said hollow shaft providing lubricant communication between said one lubricant chamber and the other.

11. A unit as defined in claim 10, said unit further including conduit means providing for inlet flow from said other lubricant chamber to the inlet of the other pump, for parallel pumping.

References Cited

UNITED STATES PATENTS 2,814,254 11/1957 Litzenberg _____ 103—109 XR
3,347,168 10/1967 Nixon _____ 103—87
3,410,218 11/1968 Fivel _____ 103—107 XR ROBERT M. WALKER, Primary Examiner U.S. Cl. X.R.
103—107, 109